(12) United States Patent
Kleiser et al.

(10) Patent No.: US 10,883,808 B2
(45) Date of Patent: Jan. 5, 2021

(54) BATTERY AUGMENTED MUNITION

(71) Applicant: US Government as represented by Sec'y of Air Force, Wright-Patterson AFB, OH (US)

(72) Inventors: Geremy Kleiser, Niceville, FL (US); Christopher Crouse, Valparaiso, FL (US); Christopher Lindsay, Niceville, FL (US); Ian Kowalczyk, King of Prussia, PA (US); Walter McCracken, Safety Harbor, FL (US); Alan Yeates, Yellow Springs, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 16/701,712

(22) Filed: Dec. 3, 2019

(65) Prior Publication Data
US 2020/0248996 A1    Aug. 6, 2020

Related U.S. Application Data

(60) Provisional application No. 62/775,134, filed on Dec. 4, 2018.

(51) Int. Cl.
*F42B 12/22* (2006.01)
*F41G 7/00* (2006.01)

(52) U.S. Cl.
CPC ............... *F42B 12/22* (2013.01); *F41G 7/00* (2013.01); *H01M 2220/20* (2013.01)

(58) Field of Classification Search
CPC ............. F42B 12/22; F42B 12/32; F41G 7/00
USPC .......................................... 102/491, 494–497
See application file for complete search history.

(56) References Cited

U.S. PATENT DOCUMENTS

| | | | | |
|---|---|---|---|---|
| 4,678,142 A | * | 7/1987 | Hirschfeld | F41G 7/226 244/3.16 |
| 5,526,749 A | * | 6/1996 | Teetzel | F41A 9/62 102/201 |
| 6,959,893 B1 | * | 11/2005 | Sadowski | F42B 10/64 102/305 |

(Continued)

*Primary Examiner* — Bret Hayes
(74) *Attorney, Agent, or Firm* — AFMCLO/JAZ; David E. Franklin

(57) ABSTRACT

A munition includes a munition body containing explosive material. An electronic subsystem is active between release and detonation of the explosive material. One or more batteries are electrically connected to the electronic subsystem to provide power to the electronic subsystem prior to detonation. The one or more batteries are positioned adjacent to the explosive material to be accelerated outward as corresponding munition projectiles after detonation, increasing the effective payload of the munition by performing dual functions. In one or more embodiments, the explosive material is cylindrically shaped and longitudinally aligned in a warhead section of the munition body. The one or more batteries are annularly positioned on lateral surface of the explosive surface to form a cellular fragmenting structure. In a particular embodiments, the munition body is a missile body containing a rocket propulsion system and the electronic subsystem comprises a missile guidance system.

3 Claims, 11 Drawing Sheets

(56) References Cited

U.S. PATENT DOCUMENTS

| | | | | |
|---|---|---|---|---|
| 7,118,825 B2 * | 10/2006 | Rastegar | ............... | F41H 11/02 |
| | | | | 429/121 |
| 7,947,937 B1 * | 5/2011 | Langner | ............... | F42B 15/01 |
| | | | | 244/3.16 |
| 2006/0196383 A1 * | 9/2006 | Parker | ................. | F42B 12/365 |
| | | | | 102/501 |

* cited by examiner

BATTERY AUGMENTED MUNITION

CROSS-REFERENCE TO RELATED APPLICATIONS

This application claims the benefit of priority under 35 U.S.C. § 119(e) to U.S. Provisional Application Ser. No. 62/775,134 entitled "Battery Augmented Munition," filed 4 Dec. 2018, the contents of which are incorporated herein by reference in their entirety.

ORIGIN OF THE INVENTION

The invention described herein was made by employees of the United States Government and may be manufactured and used by or for the Government of the United States of America for governmental purposes without the payment of any royalties thereon or therefore.

BACKGROUND

1. Technical Field

The present disclosure generally relates to testing apparatus and methods of fabricating a casing of a munition containing high explosives, and more particularly to casings that fragment into projectiles after detonation of the munition.

2. Description of the Related Art

Munitions have long been developed that include a casing that contains or that fragments into projectiles when high-explosive material within the casing detonates. The projectiles accelerate during the detonation to a speed that imparts damaging kinetic energy to personnel, equipment and structures that are hit. The projectiles are formed of inert material that contribute to the size and weight of the munition but not to the stored explosive potential. This increase in weight and size limits the lethality of the munition as well as imposing logistical burden in transport and storage.

More recently, significant development in munitions has been devoted making the munition "smart". Guidance systems, programmable fusing, and steering mechanisms enable more accurate and flexible delivery of the munition. While key to making the munition more accurate, these supporting subsystems also add weight and size to the munition, limiting the amount of volume within the casing that can be reserved for high explosive or other payloads.

BRIEF SUMMARY

In one aspect, the present disclosure provides a munition including a munition body containing explosive material. The munition includes an electronic subsystem that is active between release and detonation of the explosive material. The munition includes one or more batteries that are electrically connected to the electronic subsystem to provide power to the electronic subsystem prior to detonation and positioned adjacent to the explosive material to be accelerated outward as a munition projectile after detonation, increasing the effective payload of the munition by performing dual functions.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

A munition includes a munition body containing explosive material. An electronic subsystem is active between release and detonation of the explosive material. One or more batteries are electrically connected to the electronic subsystem to provide power to the electronic subsystem prior to detonation. The one or more batteries are positioned adjacent to the explosive material to be accelerated outward as corresponding munition projectiles after detonation, increasing the effective payload of the munition by performing dual functions. In one or more embodiments, the explosive material is cylindrically shaped and longitudinally aligned in a warhead section of the munition body. The one or more batteries are annularly positioned on lateral surface of the explosive surface to form a cellular fragmenting structure. In a particular embodiments, the munition body is a missile body containing a rocket propulsion system and the electronic subsystem comprises a missile guidance system.

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Figure 1:
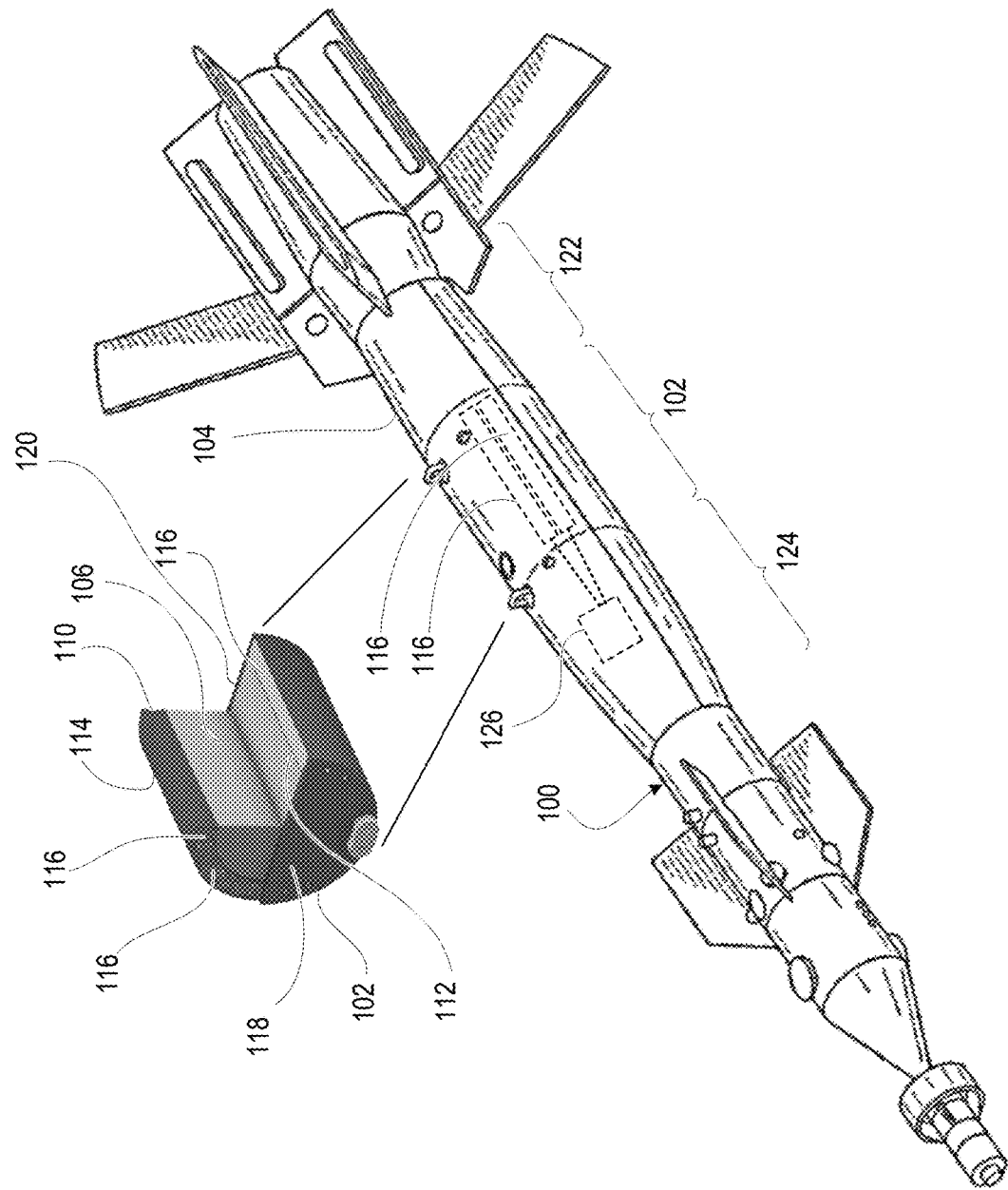
FIG. 1 is an isometric view of a battery-augmented munition with a detail exploded and partially cutaway view of a munition section, according to one or more embodiments.
Figure 2:
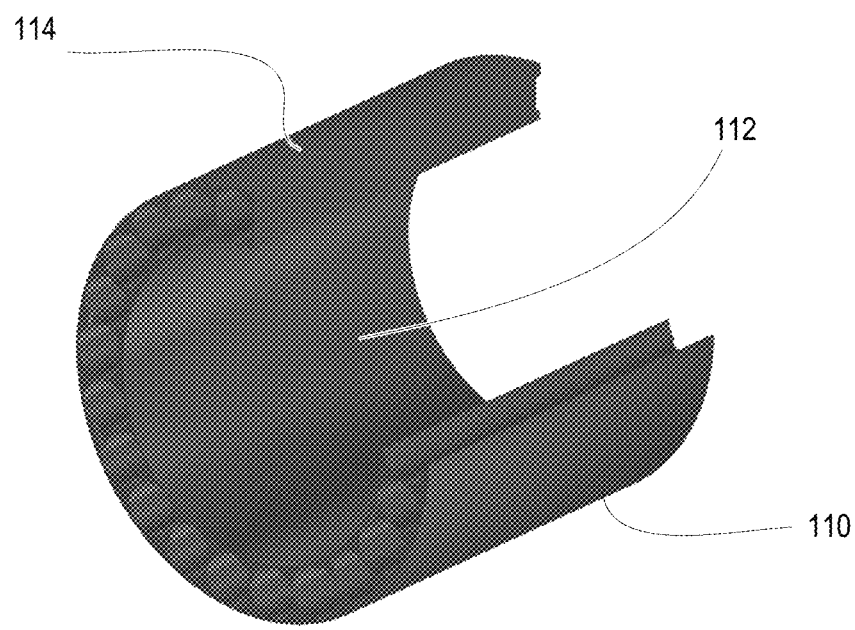
FIG. 2 is an isometric view of case structure of the munition section, according to one or more embodiments.
Figure 3:
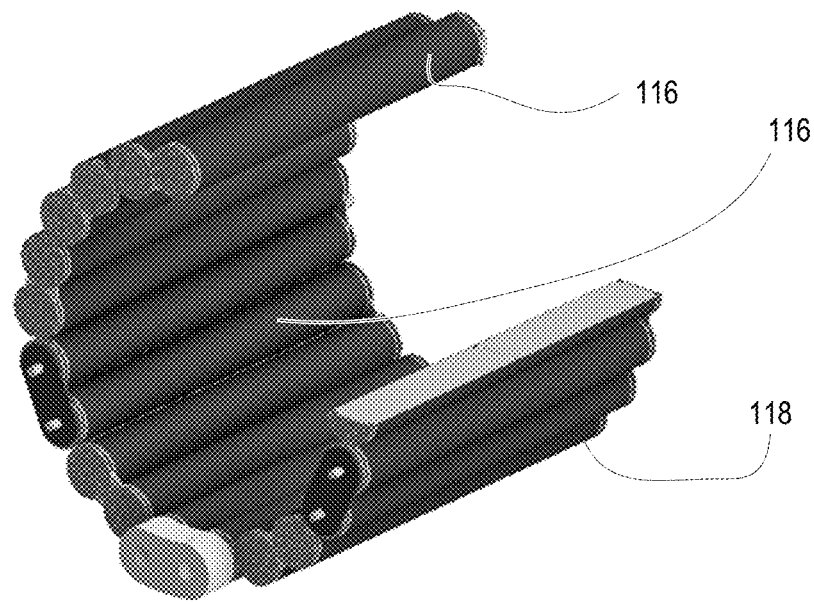
FIG. 3 is an isometric view of a power supply of the munition section, according to one or more embodiments.

In FIG. 1 is a perspective view of an example battery-augmented munition 100 having a cylindrical warhead section 102 of a munition body 104. Cylindrical warhead 102 is depicted in a detail exploded view with a longitudinal quarter cutaway. Cylindrical warhead 102 includes cylindrically shaped explosive material 106, such as 4.5 lbs of PBXN-112. FIGS. 1-2 illustrate that case structure 110 of cylindrical warhead section 102 formed of steel fragmenting sheet metal. Case structure 110 has inner and outer lateral cylindrical walls 112, 114. FIG. 1 illustrates that case structure 110 annularly encloses rod-shaped batteries 116 that longitudinally aligned to be positioned laterally adjacent around explosive material 106. Front and back circular base walls 118, 120 separate internal components of cylindrical warhead section 102 from adjacent sections of munition body 104. In an exemplary embodiments, a propulsion section 122 is aft and an electronics section 124 containing electronic subsystem 126, such as missile seeker/guidance system, is forward of warhead section 102. FIG. 3 illustrates that rod-shaped batteries 116 are electrically interconnected to form power supply 118.

With returning reference to FIG. 1, an electronic subsystem 120 is active between release and detonation of explosive material 106. Rod-shaped batteries 116 are electrically connected to electronic subsystem 126 to provide power to electronic subsystem 126 prior to detonation of explosive material 106. Rod-shaped batteries 106 are positioned adjacent to explosive material 106 as reactive material in a cellular fragmenting structure to be accelerated outward as corresponding munition projectiles after detonation of explosive material 106, increasing the effective payload of the munition 100 by performing dual functions. In one or more embodiments, battery-augmented munition 100 provides for greater system efficiency with increased load out and increased range for a give volume. Munition delivery and explosive ballistic projectile functions are provided by hybrid components with component size reductions. Flexible damage generator delivers electrical power for emerging tactical missiles.

In one or more exemplary embodiments, battery-augmented munition 100 provides electrical power for 90 seconds flight time with 500 W constant for initial 75% of flight and with 5000 W for terminal 25% of flight. BAM designed for storage and operation in a temperature range of −65 to 165 degrees F. Dimensions of battery-augmented munition 100 can be: (i) 152.4 mm (6 inch) diameter; (ii) 152.4 mm (6") length; and (iii) 1500 fragments with average velocity $v_{avg}$=1.4 km/s. Rod-shaped batteries 116 can be lithium ion cells or based on other chemistries and can have commercially available shapes of be conformally shaped.

Figure 4:
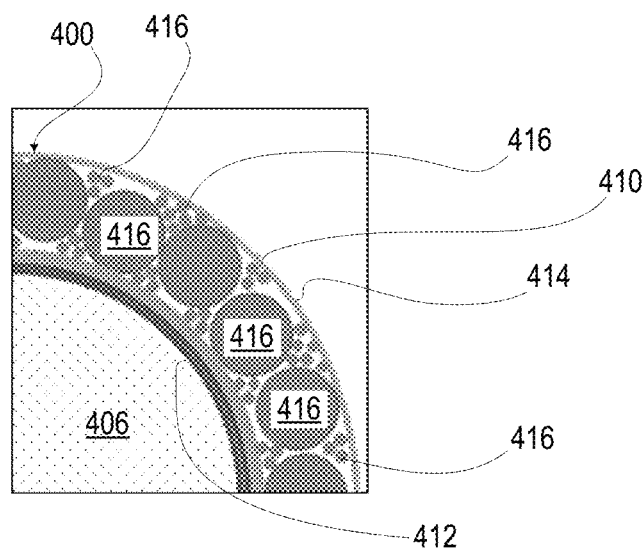
FIG. 4 is a cross section detail view of an example battery-augmented munition having additional small projectiles filling voids between batteries, according to one or more embodiments.

FIG. 4 is a lateral cross section view of an example battery-augmented munition 400 portion of an annular case structure 410 having inner and outer cylindrical walls 412, 414 that enclose annularly positioned rod-shaped batteries 416 around explosive material 406. Voids between inner and outer cylindrical walls 412, 414 are filled with small projectiles 416 as additional reactive material.

Figure 5:
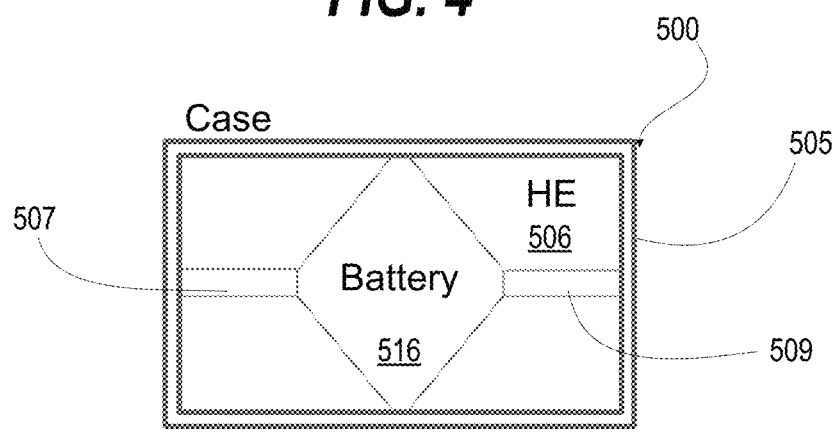
FIG. 5 is a diagram of an example battery-augmented munition having a battery embedded in explosive material, according to one or more embodiments.

FIG. 5 is a cross sectional view of example battery-augmented munition 500 having battery 516 that is centrally embedded within explosive material 506 within a munition case 505. Fore and aft electrical conduits 507, 509 provide electrical connectivity to other sections of battery-augmented munition 500.

Figure 6:
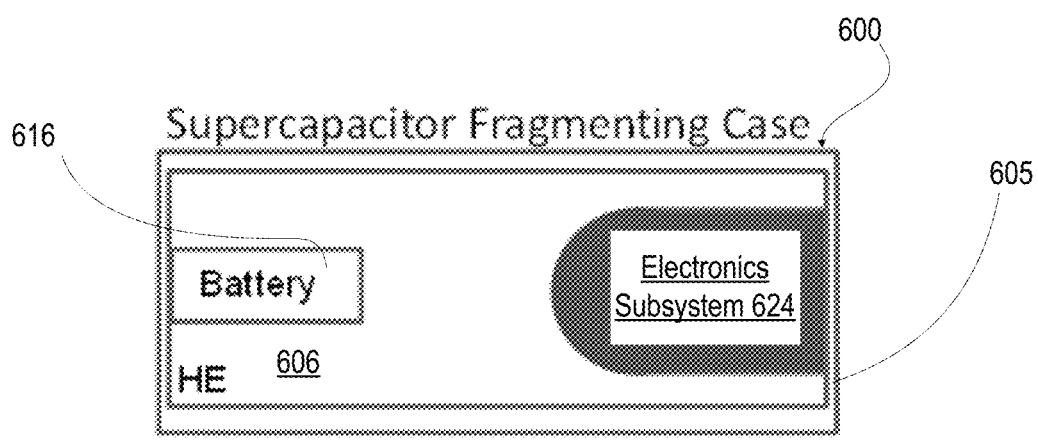
FIG. 6 is a diagram of an example battery-augmented munition have a battery and electronics subsystem peripherally positioned and partially embedded in explosive material, according to one or more embodiments.

FIG. 6 is a cross sectional view of example battery-augmented munition 600 having peripherally positioned battery 616 and electronics subsystem 624 that are partially embedded within explosive material 606 within a supercapacitor munition case 605.

According to aspects of the present innovation, a demonstration was conducted for exploiting electrical delivery devices for munition damage mechanisms. The demonstration was motivated by: (i) a need for greater system efficiency with increased load-out with smaller yet more effective weapons or increased range of weapon; (ii) need to diversity weapon power source (Industrial base is limited. Thermal battery form factor is not ideal for volume packing efficiency); (iii) electrical power demand continues to increase (In some cases, battery volume is overtaking ordnance volume allocation); and hybrid design with multi-functionality, rather than component optimization, supports these objectives. The demonstration proved that a warhead and power supply can be combined in one device for increased system efficiency. Batteries as power sources may have high energy density but power (chemical energy release) is throttled by a separator. In particular, the demonstration supports the long-term objective of providing a warhead design capable of delivering electrical power for emerging tactical missiles. In particular, proof of concept test assessed potential of lithium (Li) ion cells to meet power requirements and to function as warhead fragments. Power requirements were 90 seconds flight time, 500 Watts constant for initial 75% of flight, 5000 Watts for terminal 25% of flight, and storage/operational temperature range of −65°-165° F. Size requirement is cylinder of 6 inches diameter and 6 inches length.

Figure 7:
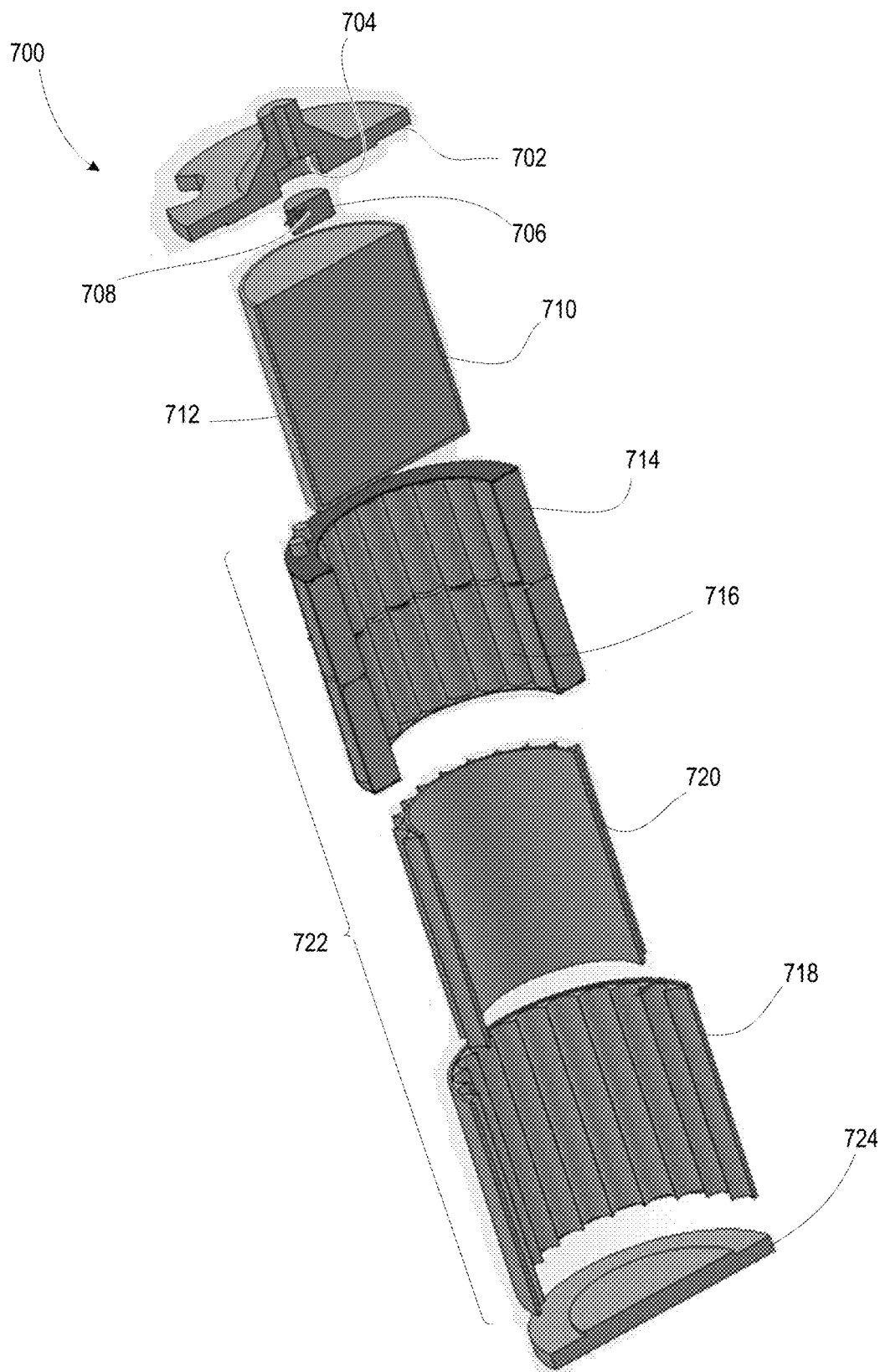
FIG. 7 is an exploded three-dimensional view of an example battery-augmented munition, according to one or more embodiments.

FIG. 7 is a disassembled view of an example battery augmented munition 700 that includes a forward closure 702 formed of steel having a central aft-facing puck-shaped recess 704 that receives a booster pellet 706 containing PBXN-5 explosive material 708. Explosive charge cup 710 formed of aluminum casing that contains PBXN-110 explosive material 712. Battery cell assembly 714 surrounds the explosive charge cup 710. In a prototype design, 44 18650 lithium ion cells 716 are used: (i) 32 aluminum cells for 100V (3.4V drops to 2.7V); and (ii) 12 steel cells for 30V (4.5V drops to 2.25V). The batteries cells 716 are annularly positioned between a cylindrical outer body 718 and a cylindrical inner body 720 that having facing longitudinal ridged channels that align to form cylindrical battery receptacles of a battery assembly 722. The battery assembly 722 provides steel and reactive fragments after performing as a power supply. The battery augmented munition 700 is capped across an aft side of the battery assembly 722 and explosive charge cup 710 by an aft closure 724 that is formed as a steel disk.

Figure 8:
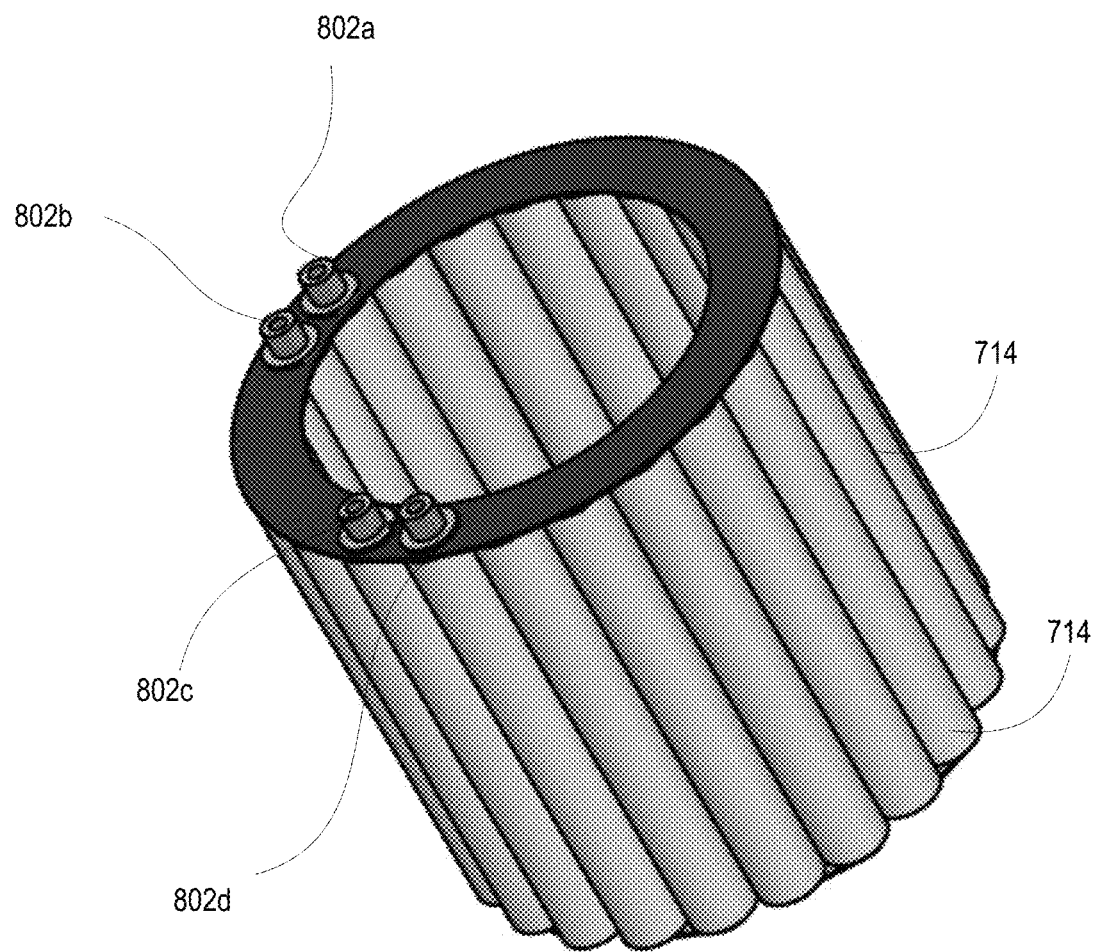
FIG. 8 depicts an expanded three-dimensional view of the battery cells assembly that provide four electrical terminals, according to one or more embodiments.
Figure 9:
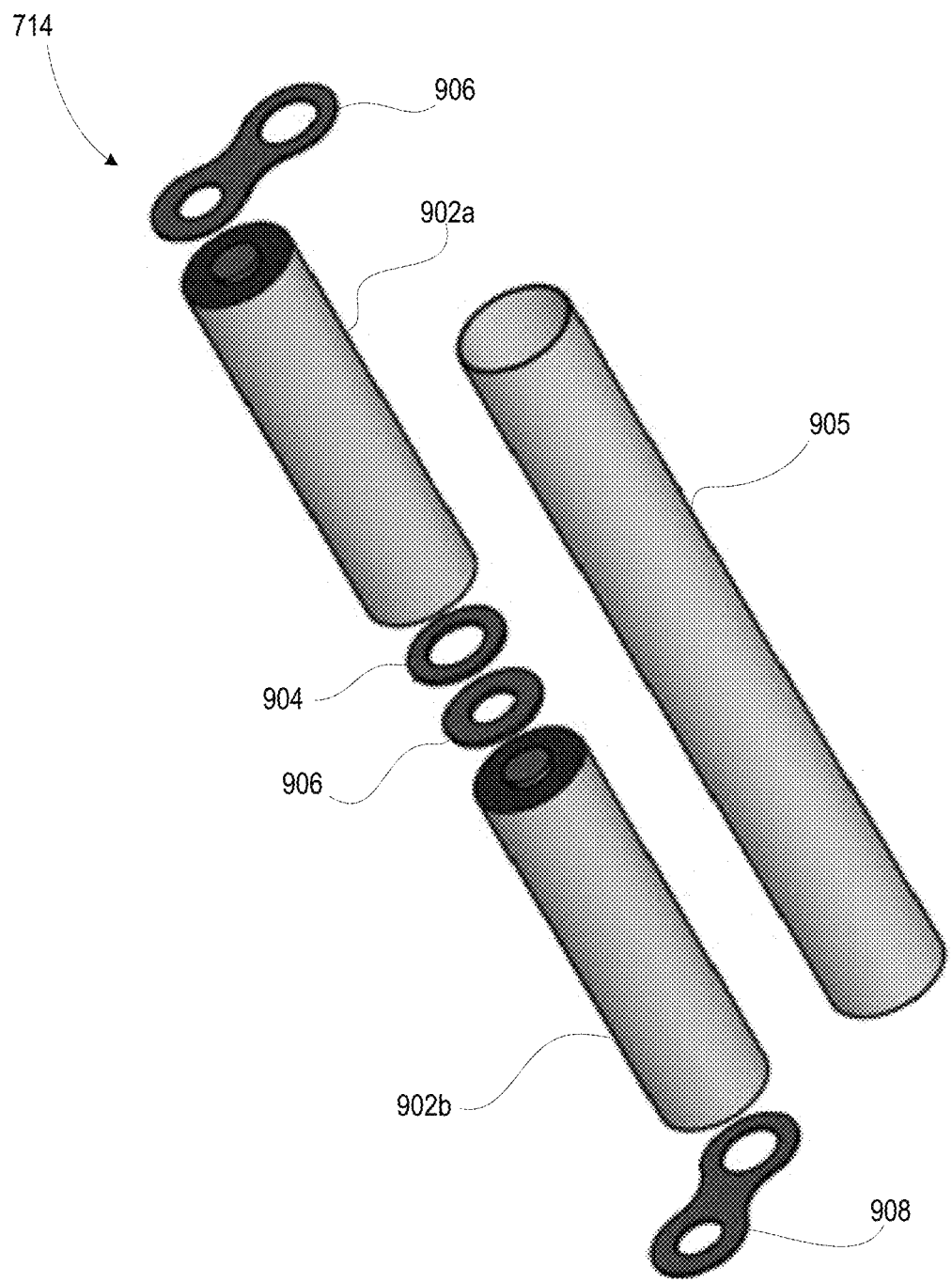
FIG. 9 depicts a battery cell that includes two serially-aligned cells, according to one or more embodiments.

FIG. 8 depicts an expanded three-dimensional view of the battery cells 714 provide four electrical terminals 802a-d: (i) −100 Volts; (ii) −30 Volts; (iii) 30 Volts; and (iv) 100 Volts. These voltages are achieves by placing battery cells 714 in serial sequence to allow for addition of voltage. In particular, FIG. 9 depicts a battery cell 714 that includes two serially-aligned commercial 18/700 cells 902a-b that separated by wide opening AL1100 inter-cell negative tab 904 and narrow opening AL1100 inter-cell negative tab. The battery cell 714 is held together by a polyvinyl chloride (PVC) heat shrink insulator sleeve 905. Positive terminal of front commercial 18/700 cell 902a is connected to an adjacent battery cell (not shown) by AL1100 inter-stick tab 906. Negative terminal of back commercial 18/700 cell 902a is connected to another adjacent battery cell (not shown) by AL1100 inter-stick tab 908.

Figure 10:
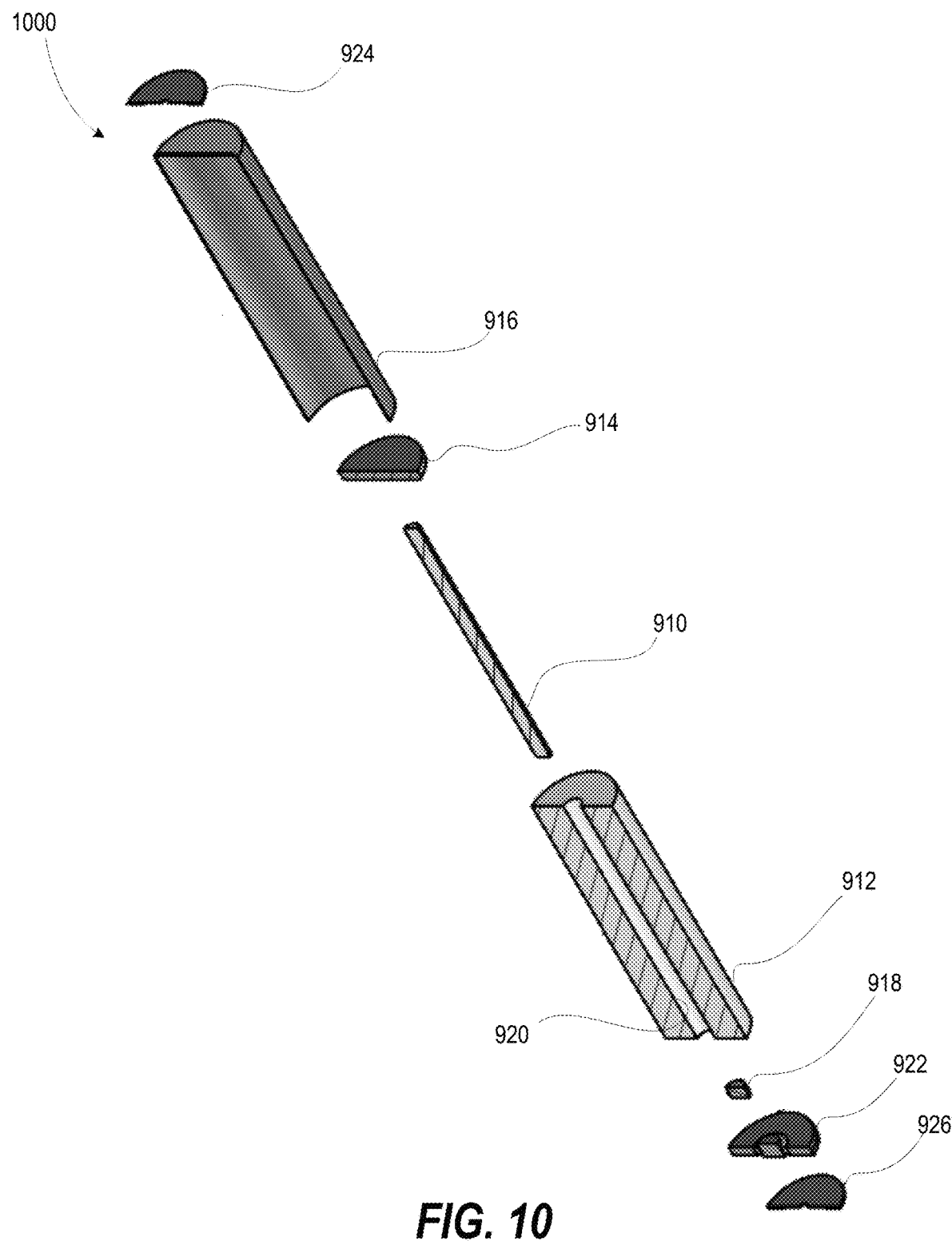
FIG. 10 depicts disassembled steel cell that includes a tungsten mandrel around which a cylindrically shaped internal electrode winding is attached, according to one or more embodiments.
Figure 11:
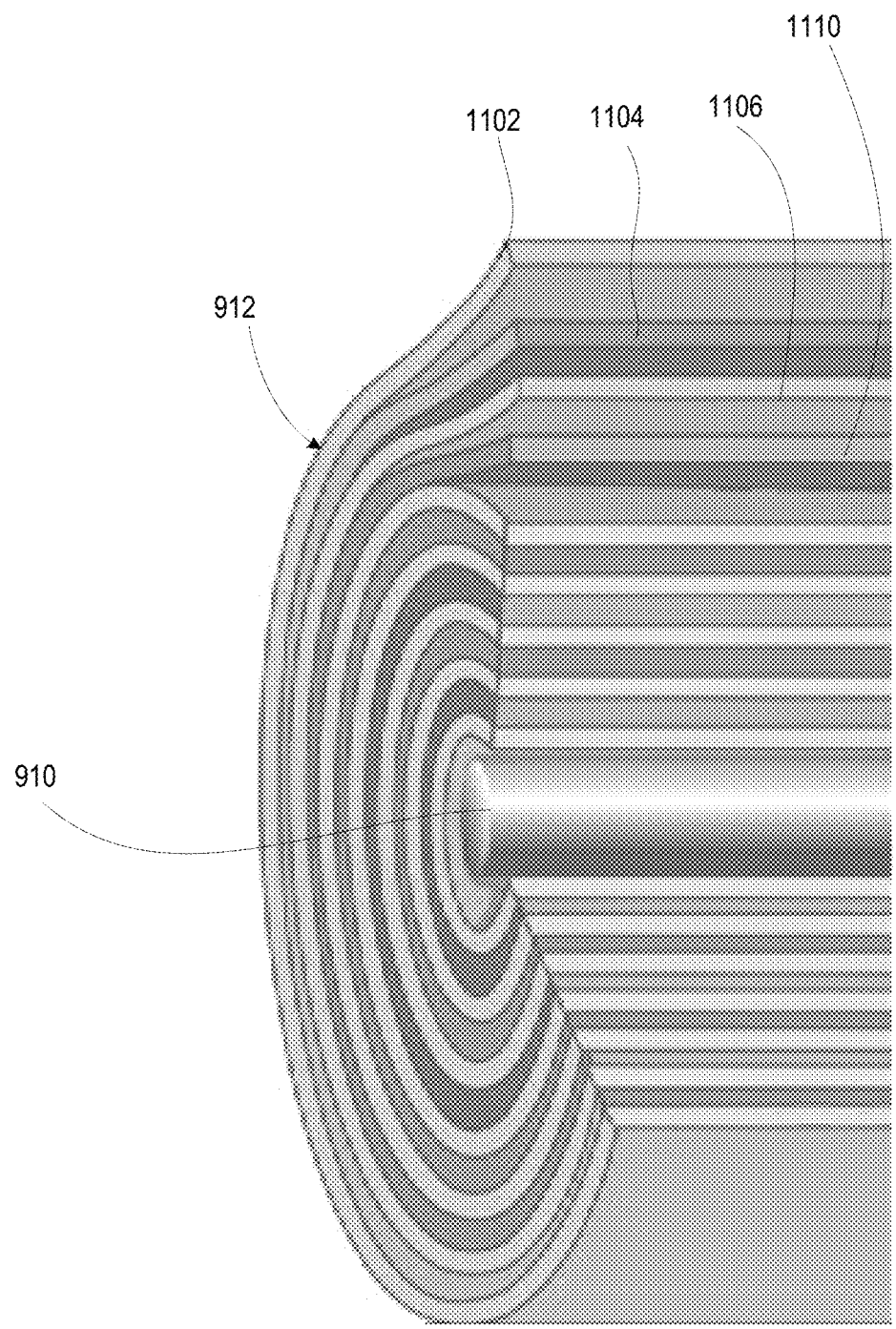
FIG. 11 depicts a cutaway view of an electrode winding and tungsten mandrel of FIG. 10, according to one or more embodiments.

FIG. 10 depicts disassembled steel cell 1000 that includes a tungsten mandrel 910 around which a cylindrically shaped internal electrode winding 912 is attached. A disk-shaped 304L stainless steel spacer 914 is on a back side of the tungsten mandrel 910 and electrode winding 912 and is received in a cylindrical top open steel case 916. A polyether ether ketone (PEEK) spacer 918 fits on a front side of the tungsten mandrel 910 in a bore 920 of the electrode winding 912. A disk-shaped cell terminal plate 922 is against a front side of the internal electrode winding 912 and PEEK spacer 918. Steel cell 1000 is electrically connected serially to other cells via 304 stainless steel negative inter-cell tab 924 and 304 stainless steel negative inter-cell tab 926. FIG. 11 depicts a cutaway view of electrode winding 912 and tungsten mandrel 910. Electrode winding 912 includes a spiral wound stack of an outer separator layer 1102, a negative electrode layer 1104, an inner separator layer 1106, and a positive electrode layer 1108. An aluminum cell does not include the mandrel.

In preparing proof of concept samples, individual cells were first assembled in two series cell sticks as shown in FIG. 9. This figure depicts the assembly for commercial cells with aluminum terminals, however this assembly method is also used for cells constructed using stainless steel or steel hardware, in which case stainless steel, nickel, or nickel plated steel tab material may be used. For this BAM prototype assembly, cell sticks were arranged in a cylindrical format according to FIG. 8. The commercial rechargeable cells were assembled in a 32 cell series configuration. The MaxPower primary cells were arranged in a 12 series cell configuration. The following components describe the fabrication of the BAM proof of concept test articles:

Aluminum shell battery cell details: Source A123 Systems: Composition: (i) secondary lithium ion, lithium iron phosphate chemistry; (ii) aluminum hardware; and (iii) cell mass 38.24 g. Performance details: (i) capacity: 0.7 Ah; (ii) maximum charge potential: 3.6V; (iii) minimum discharge potential: 2.6 V; and (iv) maximum current: 100 A continuous.

Steel shell battery cell details: Source: MaxPower Incorporated. Composition details: (i) primary lithium metal anode carbon monofluoride/manganese dioxide hybrid; (ii) cathode; (iii) stainless steel hardware; and (iv) cell mass: 42.27 g. Performance details: (i) capacity: 4.5 Ah; (ii) open circuit potential: 3.6 V; (iii) minimum discharge potential: 0 V; (iv) maximum current: 2 A continuous (higher rate cells may be constructed but will deliver less capacity).

Figure 12:
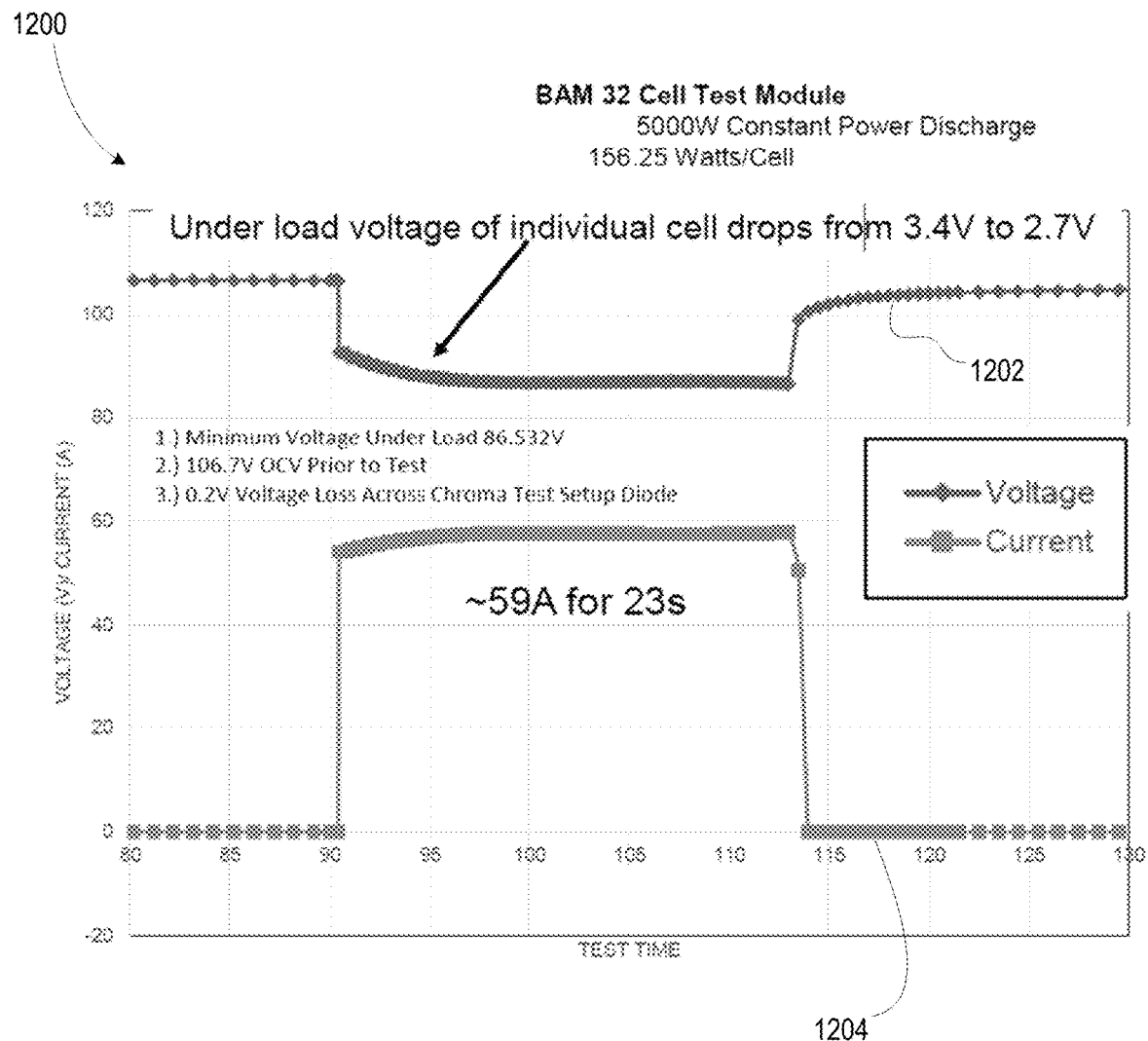
FIG. 12 depicts a graphical diagram of a power delivery test including a voltage plot and a current plot, according to one or more embodiments.

FIG. 12 depicts a graphical diagram 1200 of a power delivery test including a voltage plot 1202 and a current plot 1204. The test includes 156.25 Watts/cell with 5000 Watts constant power discharge. Under load voltage, individual cell voltage drops from 3.4 Volts to 2.7 Volts. Current was approximately 59 Amps for 23 seconds. The electrical test shows that the hybrid design satisfies the power requirements.

PHYSICAL TEST RESULTS: ELECTRICAL: (a) Energy Density, Wh/L of Secondary (Rechargeable) lithium-ion cells: 121 Wh/L; (b) Specific Energy Wh/kg of Secondary (Rechargeable) lithium-ion cells: 56 Wh/kg; (c) Power Density W/kg of Secondary (Rechargeable) lithium-ion cells 17403 W/L; (d) Specific Power of Secondary (Rechargeable) lithium-ion cells 8106 W/kg; (e) Energy Density, Wh/L of Primary (Non-rechargeable) lithium-ion cells 625 Wh/L; (f) Specific Energy Wh/kg of Primary (Non-rechargeable) lithium-ion cells 244 Wh/kg; (g) Power Density W/L of Primary (Non-rechargeable) lithium-ion cells 278 W/L; and (h) Specific Power W/kg of Primary (Non-rechargeable) lithium-ion cells 108 W/kg. Energy Density, (i) Wh/L of Thermal Batteries 126 Wh/L; (j) Specific Energy Wh/kg of Thermal Batteries 39 Wh/kg; (k) Power Density W/kg of Thermal Batteries 6622 W/L; and (l) Specific Power of Thermal Batteries 2058 W/kg.

PHYSICAL TEST RESULTS: RESIDUAL ENERGY: The system consists of 44 18650 Lithium ion cells capable of delivering 100V (50 A) nominal from one electrical tap and 28V (20 A) nominal from another electrical tap. Secondary 5000 W, 100V for 23 Seconds, Expended Capacity: 0.31 Ah, and Residual Capacity: 0.39 Ah (55%). Primary—Residual Energy: Expended Capacity: 0.33 Ah, Residual Capacity: 4.16 Ah (92%).

Figure 13:
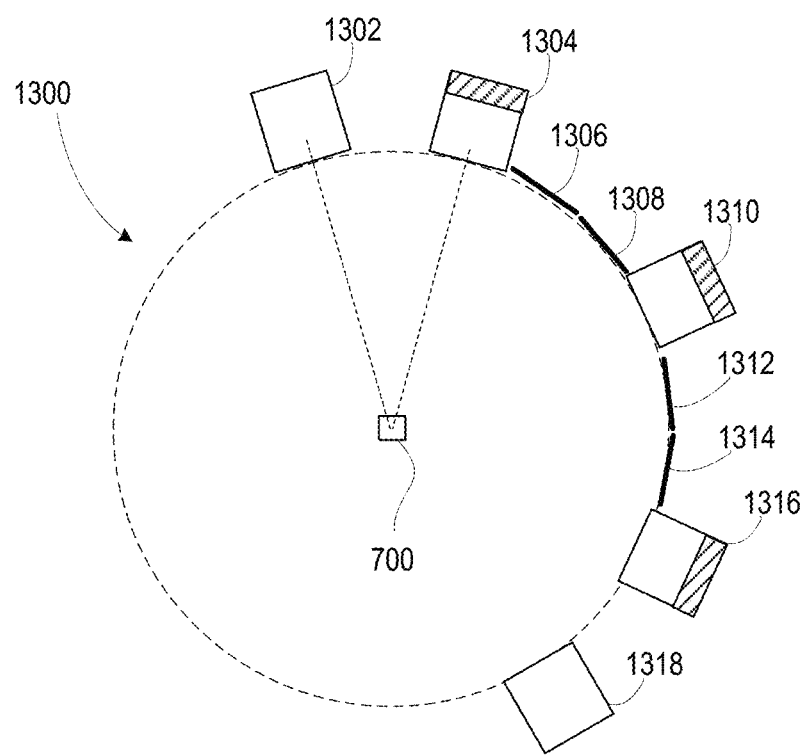
FIG. 13 depicts a test layout where the damage effects of the example battery augmented munition was tested, according to one or more embodiments.

FIG. 13 depicts a test layout 1300 where the damage effects of the example battery augmented munition 700 was tested. Targets were placed in a semi-circle around munition 700: (i) A steel panel target 1302 of 1/16" thickness; (ii) recovery bundle 1304; (iii) a first velocity panel 1306; (iv) a second velocity panel 1308; (v) a recovery bundle 1310; (vi) a third velocity panel 1312; (vii) a fourth velocity panel 1314; (viii) a recovery bundle 1316; and (ix) an aluminum panel target 1318 of 1/16" thickness. High speed videography was taken of ballistic impacts to steel and aluminum panel targets 1302, 1318. Based on videography, it is observed that some aluminum cells broke up during launch and some aluminum cells penetrate the panels. Steel cells got through multiple plates. Steel fragments from the case were generally about 8 cm in length. Aluminum fragments were generally smaller exhibiting fragmenting of the aluminum casing.

Figure 14:
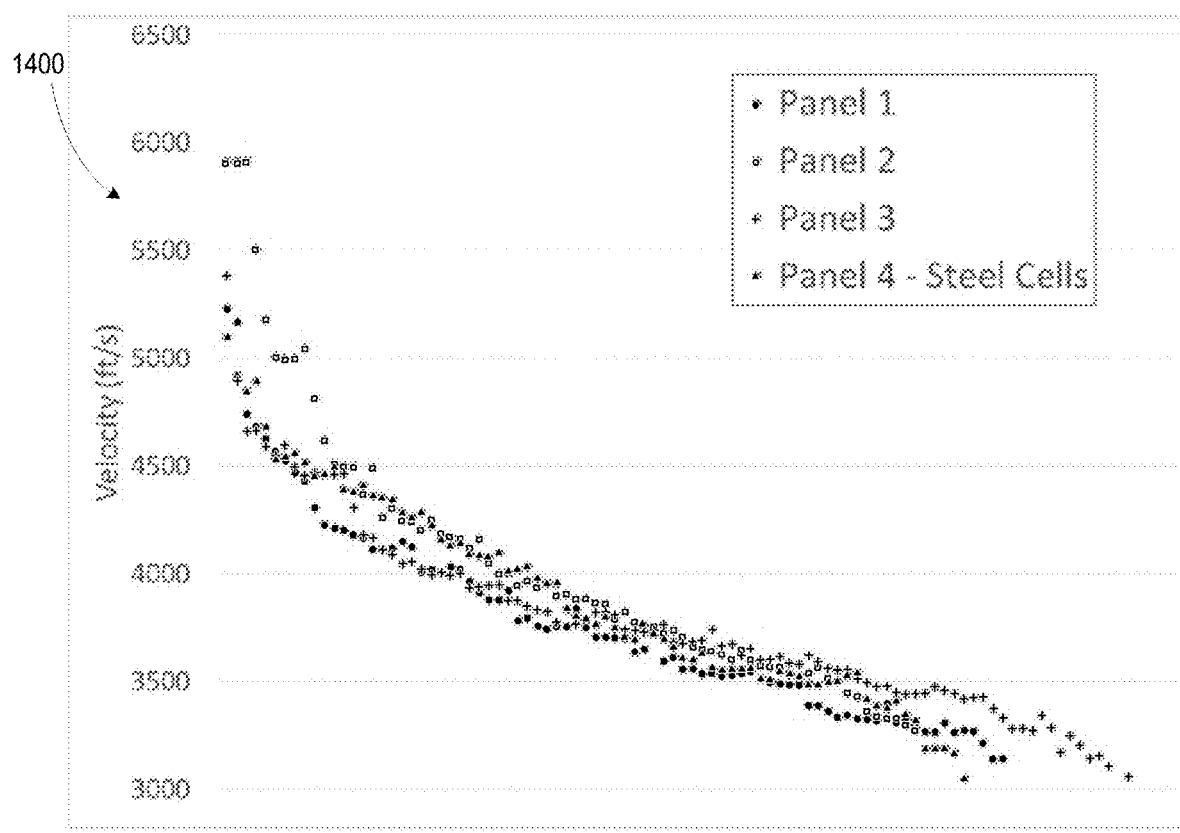
FIG. 14 depicts a graphical plot of shrapnel data detected by four velocity panels during a ballistic test, according to one or more embodiments.

FIG. 14 depicts a graphical plot 1400 of shrapnel data detected by all four velocity panels 1306, 1308, 1312, and 1314 (FIG. 13). The size of the shrapnel recovered in combination with the measured velocities indicate that the batteries provide secondary damage. Difference between cell penetration of aluminum versus steel and reactivity illustrate cell design opportunities to tailor energy deposition to a target.

DESIGN FLEXIBILITY: As demonstrated in the commercial consumer electronics market, cell geometries can be engineered to fit in any form factor required by the product particularly, if cost and throughput are not key driving forces. In most applications a cylindrical, wound cell, as used in this test, is most easily produced, with readily available components and assembly equipment. However, cells of any shape could be created including ovular and rectangular windings as well as flat stacked cells which are projections of any 2-D cross-section.

WARHEAD: Some aluminum battery shells began to come apart upon explosive launch and the separator was disrupted resulting in significant reactivity during flight of the deformed battery shell. This is evident by the clouds of white light expanding with the typical detonation products associated with a high explosive warhead. Since this was a proof of concept test it is unknown how many aluminum battery shells reacted upon launch but clearly some of them remained intact and only came apart upon penetration of the aluminum and steel witness panels. It is assumed the steel cased battery cells remained intact during launch since they were more robust in design and penetrated more witness panels. The difference in explosive launch survivability, penetration performance and corresponding energy release highlights the flexibility of the concept and the ability to tune the response to a wide variety of targets.

Advantages of the Battery Augment Munition (BAM) Concept:
(i) Improved weapon integration flexibility: Batteries no longer need to be independent items which enables creativity in distribution and may positively influence mass properties (i.e. placing Center of Gravity in desired location);
(ii) Improved weapon volume efficiency: Batteries no longer need to be independent items and can improve packaging and enable smaller weapons with equivalent effectiveness to larger weapons. For example, thermal batteries are efficient when in right circular cylinder form but packing within a larger right circular cylinder such as a missile body creates wasted space. This approach eliminates the wasted space and allows the power supply to be more efficiently distributed within the weapon;
(iii) Improved energy density for a weapon in order to deliver higher electrical energy over longer time frames for long flight weapons with minimal impact to volume compared to traditional power deliver devices;
(iv) May deliver enhanced lethality and effectiveness through pyrophoric effects for greater damage to the target and yield visible battle damage assessment. Batteries can be considered slow energy release warheads because they are typically composed of highly reactive materials with the reactivity controlled using a separator. For this concept the separator functions normally but then disrupted upon demand to release the residual energy after flight to target. The residual energy can be significant and has the potential to ignite components within the target;
(v) May lead to lower cost and schedule times by leveraging commercial off the shelf (COTS) technology. Most batteries/power supplies for missiles are thermal batteries with a disadvantage of shape and unique fabrication equipment and expertise. The BAM concept can leverage power supplies technologies that are being developed for the mobile phone and electric automotive markets and reap the cost and schedule benefits; and
(vi) The BAM concept broadens the industrial base for delivering electrical power supplies to weapons leveraging mobile and automotive technologies which also reduces thermal battery dependence. Strengthening the industrial base for weapons is important to DoD.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A munition comprising:

a munition body containing explosive material;

an electronic subsystem that is active during flight of the munition before detonation of the explosive material; and two or more batteries that are electrically connected to the electronic subsystem to provide power to the electronic subsystem during flight prior to detonation and positioned adjacent to the explosive material to be accelerated laterally outward away from a longitudinal axis of the munition body as a corresponding at least one munition projectile after detonation, increasing the effective payload of the munition by performing dual functions, wherein:

the explosive material is cylindrically shaped and longitudinally aligned in a warhead section, and the two or more batteries are annularly positioned on a lateral material of the explosive surface to form a cellular fragmenting structure.

2. The munition of claim 1, wherein:

the munition body is a missile body containing a rocket propulsion system; and the electronic subsystem comprises a missile seeker/guidance system.

3. The munition of claim 2, wherein the two or more batteries provide power to the electronic subsystem after release of the missile from an aircraft.

* * * * *